(12) United States Patent
Lin et al.

(10) Patent No.: US 8,044,315 B2
(45) Date of Patent: Oct. 25, 2011

(54) BUTTON STRUCTURE

(75) Inventors: San-Feng Lin, Taipei (TW); Chih-Yung Chi, Taipei (TW); Wei Wu, Taipei (TW)

(73) Assignee: Asustek Computer Inc, Taipei (TW)

( * ) Notice: Subject to any disclaimer, the term of this patent is extended or adjusted under 35 U.S.C. 154(b) by 0 days.

(21) Appl. No.: 12/826,321

(22) Filed: Jun. 29, 2010

(65) Prior Publication Data

US 2010/0265677 A1   Oct. 21, 2010

Related U.S. Application Data

(63) Continuation of application No. 11/510,587, filed on Aug. 28, 2006, now Pat. No. 7,767,923.

(30) Foreign Application Priority Data

Dec. 20, 2005  (TW) .............................. 94145350 A

(51) Int. Cl.
*H01H 13/70* (2006.01)
(52) U.S. Cl. ......................... 200/345; 200/339; 200/315
(58) Field of Classification Search ................... 200/345
See application file for complete search history.

(56) References Cited

U.S. PATENT DOCUMENTS

| 3,691,324 | A | * | 9/1972 | Brantingson | .................. 200/5 E |
| 4,883,932 | A | * | 11/1989 | Van Hout et al. | ............. 200/339 |
| 6,037,552 | A | * | 3/2000 | Yamada | ......................... 200/339 |
| 7,094,983 | B2 | * | 8/2006 | Tsunemoto | ................... 200/339 |
| 7,217,898 | B2 | | 5/2007 | Chien et al. | |
| 7,394,038 | B2 | | 7/2008 | Chang | |
| 7,544,904 | B2 | | 6/2009 | Nakatani et al. | |

* cited by examiner

*Primary Examiner* — Renee S Luebke
*Assistant Examiner* — Lheiren Mae Caroc
(74) *Attorney, Agent, or Firm* — Birch, Stewart, Kolasch & Birch, LLP

(57) ABSTRACT

An electronic device includes a housing, a button plate, a support element and a printed circuit board. The housing has an opening. The button plate is disposed at the opening of the housing, has a central region and two sides, wherein the button plate is mounted to the housing through the two ends of the two sides formed by elastic arms respectively. The support element is disposed under the central region of the button plate for defining the button plate into left and right parts. The printed circuit board is located underneath the support element, has two switches located respectively corresponds to the left and right parts of the button plate.

11 Claims, 6 Drawing Sheets

BUTTON STRUCTURE

CROSS-REFERENCE TO RELATED APPLICATIONS

This application is a Continuation of co-pending application Ser. No. 11/510,587, filed on Aug. 28, 2006, the entire contents of which are hereby incorporated by reference and for which priority is claimed under 35 U.S.C. §120. This nonprovisional application also claims priority under 35 U.S.C. §119(a) on Patent Application No. 094145350 filed in Taiwan R.O.C. on Dec. 20, 2005, the entirety of which is herein incorporated by reference.

FIELD OF THE INVENTION

The present invention relates to a button structure, and more particularly to a button structure that has a thinner design in its central region.

BACKGROUND OF THE INVENTION

Along with the prosperity in portable electronic products, the notebook computer has a trend of light-weight and becomes popular with users in the youth generation. Besides the appearance, the practical function of the notebook computer is also one of key factors to determine a final purchase of a notebook computer. One of various options in a typical notebook computer is the index device for controlling the cursor on the screen. Options of the index devices include mice, track balls, joy sticks, touch pads, push pillars and so on. In particular, the touch pad whose operation involve only movements of user's finger on the touch pad and some key striking is definite a suitable device to be built in the notebook computer.

Referring to FIG. 1a, a perspective view of a conventional notebook having a touch pad is shown. The notebook 1 (i.e. briefing of "notebook computer") includes an upper housing 101, a lower housing 102, a display screen 11, an operation panel 12 and a touch pad assembly 13. The display screen 11 and the operation panel 12 are located respectively on the upper housing 101 and the lower housing 102. The touch pad assembly 13 is located on the lower housing 102 next to the operation panel 12.

Referring to FIG. 1b, a cross sectional view of the touch pad 13 along line AA' of FIG. 1a is shown. The touch pad assembly 13 includes a touch pad 131, a fixed frame 132 and a printed circuit board 133. The fixed frame 132 is transversely (in the paper view) structured to the lower housing 102. The touch pad 131 is then mainly supported by the fixed frame 132 in the middle. The printed circuit board 133 sets right under the touch pad 131 and have two switches 134 on two sides with respect to the fixed frame 132. By depressing the touch pad 131 properly to trigger the switch 134, a predetermined electrical signal can be generated and forwarded to the printed circuit board 133 so as to initiate a preset action of the notebook computer.

For the middle-located fixed axle is a solid support with respect to the touch pad, so a depression close enough to the fixed axle would be quite possible to cause no substantial deflection to the touch pad so that an expected electrical action at the switch under the touch pad might be missed. Further, for the fixed axle halves the elastic touch pad, no seesaw-like motion about the fixed axle can be provided to avoid a possible double hitting at both halves of the touch pad, which definitely leads to a wrong or invalid switch action.

SUMMARY OF THE INVENTION

The object of the present invention is to provide to a button structure that has a button plate having a thinner central region.

In accordance with the embodiment of the present invention, the button structure applied to an electronic device includes a housing, a button plate, a support element and a printed circuit board. The button plate is located in a central opening of the housing. A central region of the button plate has a first thickness, and two sides of the button plate have a second thickness, in which the second thickness is thicker than the first thickness. Two ends of the button plate are separately formed as respective elastic arms. The support element is sited under the button plate right under the central region of the button plate. With the support element, the button plate is defined into left and right parts. The printed circuit board sets underneath the support element and has two switches corresponds to the left and right parts of the button plate.

In a preferred embodiment, the button plate is a thickness-varying plate with a thinner thickness in the central region, but the upper surface of the button plate is maintained as a flat surface.

In a preferred embodiment, the support element is made of a transparent material for transmitting light from a light source on the printed circuit board to the central region of the button plate.

In a preferred embodiment, a bracket under the support element is included to provide a bracket's hole for engaging the support element.

BRIEF DESCRIPTION OF THE DRAWINGS

Other features and advantages of this invention will become more apparent in the following detailed description of the preferred embodiments of this invention, with reference to the accompanying drawings, in which:

FIG. 1b is a cross sectional view along line AA' of FIG. 1a;

FIG. 2b is a cross sectional view of the button structure of FIG. 2a;

FIG. 4a is an exploded view of the button structure in the present invention; and FIG. 4b is a perspective view showing an assembly state of FIG. 4a.

DETAILED DESCRIPTIONS OF THE PREFERRED EMBODIMENT

The present invention is related to a button structure, and more particularly to a button structure that has a thinner design in the central region of an elastic plate playing as the conventional touch pad.

Figure 1A:
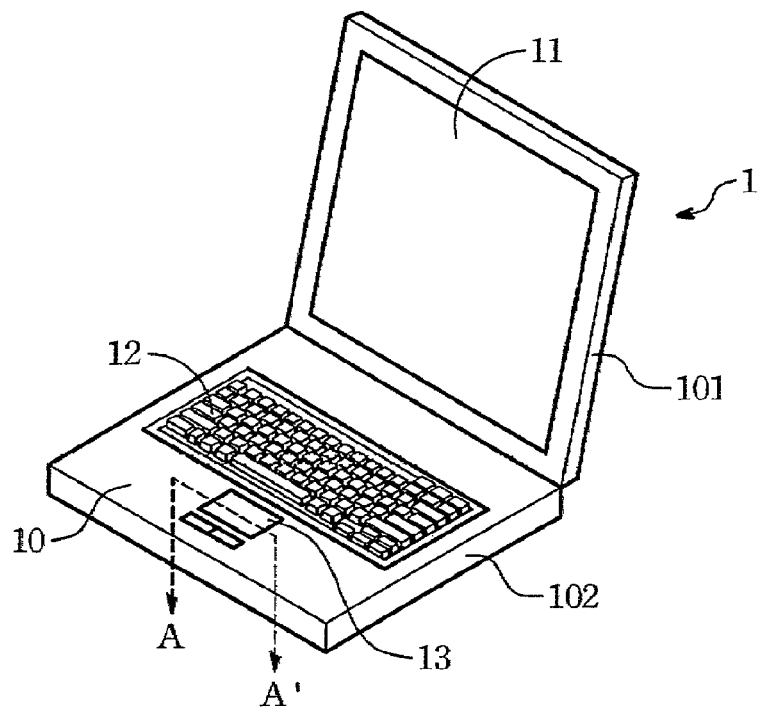
FIG. 1a is a perspective view of a conventional notebook computer having a touch pad.
Figure 1B:
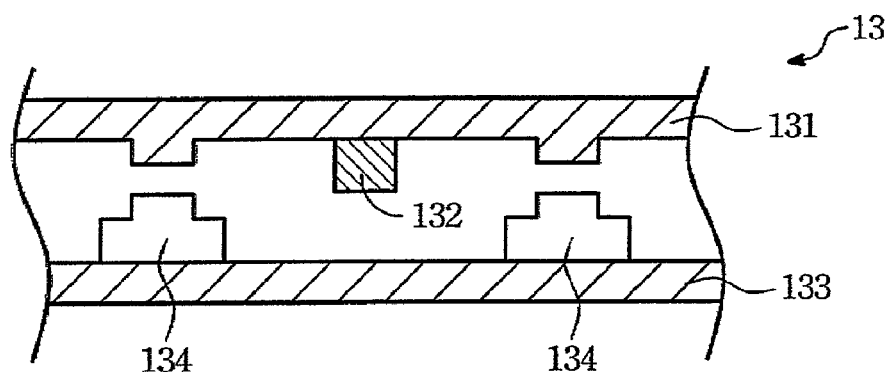
Figure 2A:
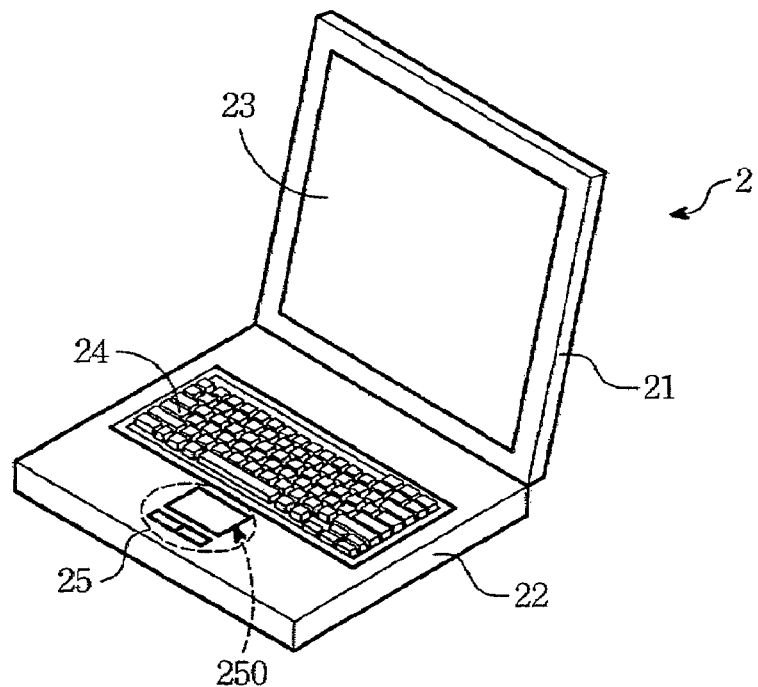
FIG. 2a is a perspective view of a notebook computer having a preferred button structure of the present invention.

Please refer to FIG. 2a, a perspective view of the button structure in the notebook computer (called notebook, thereafter) is shown. The notebook 2 comprises an upper housing 21, a lower housing 22, a display screen 23, an operation panel 24 and a button structure 25. The display screen 23 and the operation panel 24 are fabricated to the upper housing 21 and the lower housing 22, respectively. The button structure 25 sets on the lower housing 22 next to the operation panel 24.

Figure 2B:
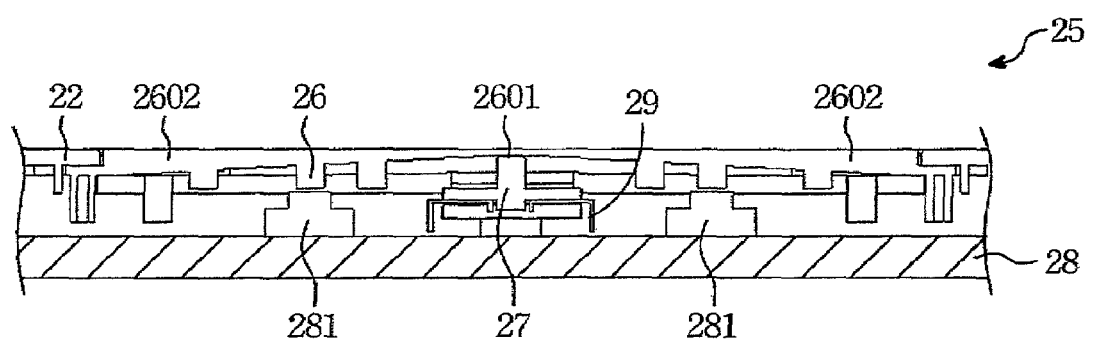

Referring to FIG. 2b, a cross sectional view of the button structure 25 of FIG. 2a is shown. The button structure 25 constructed at the lower housing 22 includes a button plate 26, a support element 27 and a printed circuit board 28. The button plate 26 is contained in a central opening 250 of the lower housing 22. A central region of the button plate 26 has a first thickness 2601, and two sides thereof have a second thickness 2602. The second thickness 2602 is thicker than the first thickness 2601. The printed circuit board 28 sets underneath the support element 27 and has two switches 281 corresponding respectively to the left and right parts of the button plate 26. Further, the printed circuit board 28 comprises a bracket 29 for loading thereabove the support element 27.

Figure 3:
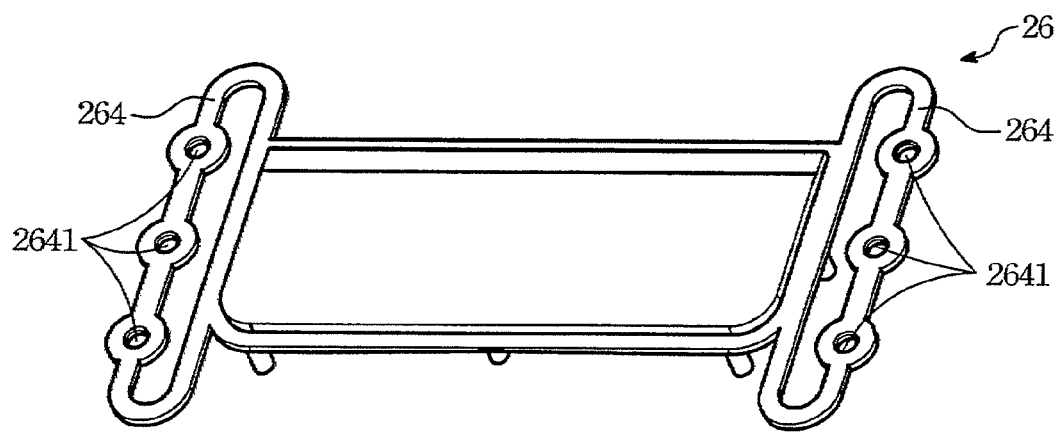
FIG. 3a is a perspective view of a preferred button plate of the present invention.
FIG. 3b is a reverse view of FIG. 3b.
FIG. 3c is a perspective view of a preferred support element of the present invention.
FIG. 3d is a perspective view of another support element of the present invention.
FIG. 3e is a perspective view of a preferred bracket of the present invention.
FIG. 3f is a perspective view showing how the bracket of FIG. 3e is mounted to a lower housing of the present invention.
Figure 3:
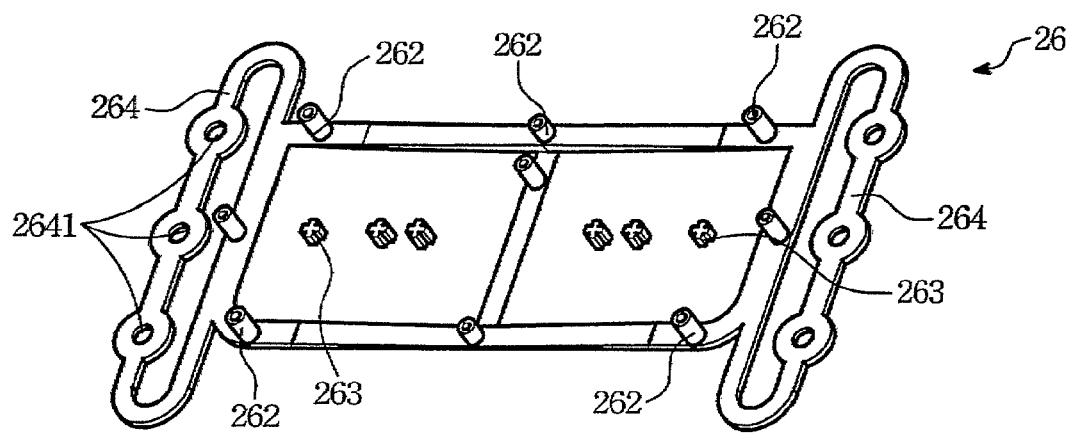
Figure 3:
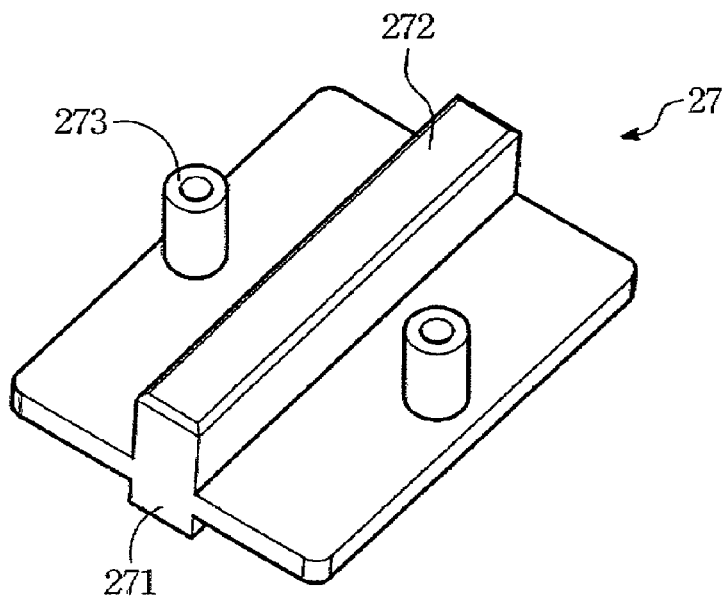
Figure 3:
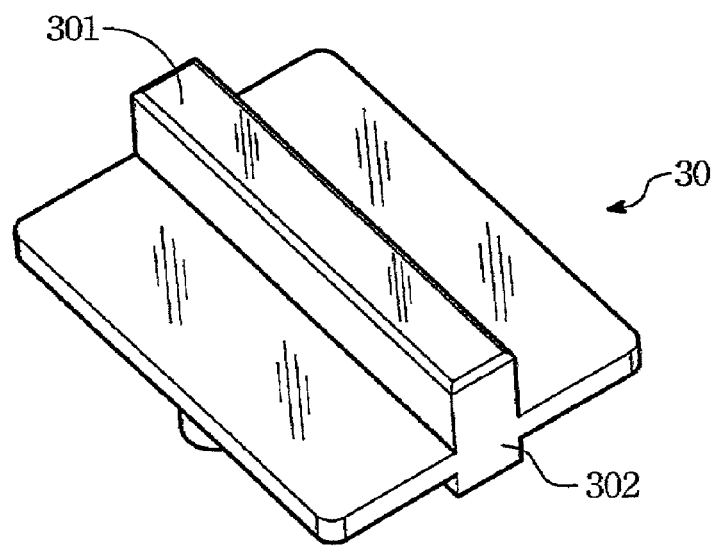
Figure 3:
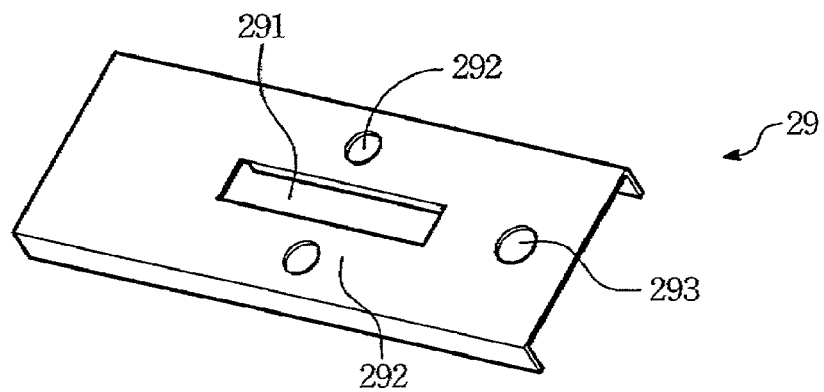
Figure 3:
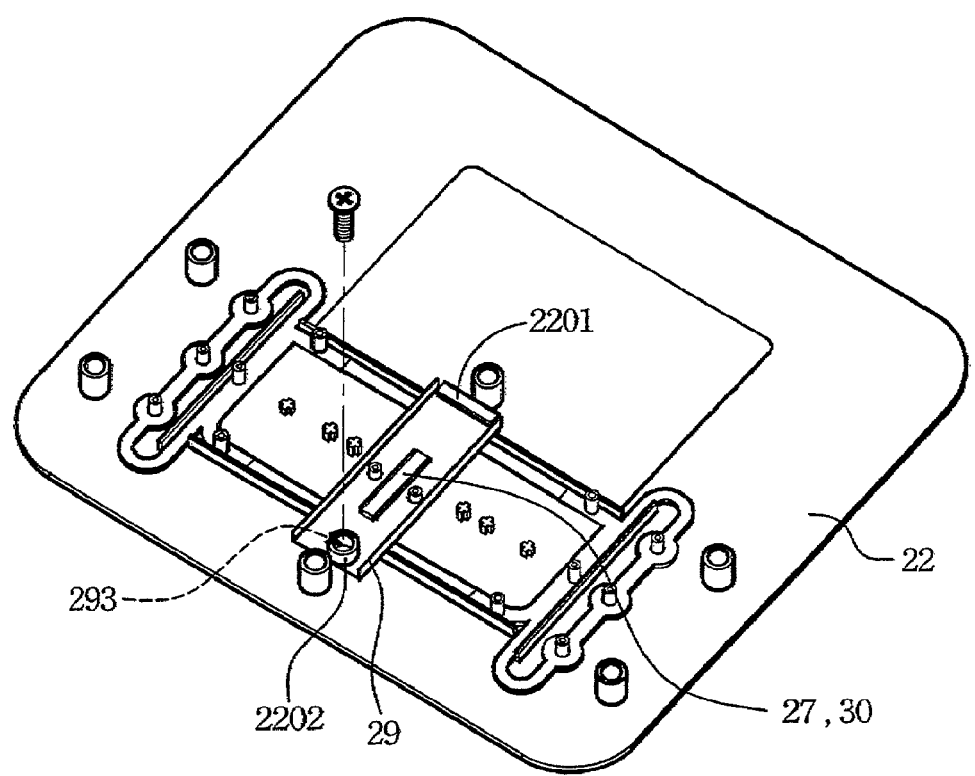

Please refer to FIGS. 3a-3b, where a perspective view and its reverse view of the button plate 26 of the present invention are respectively shown. The button plate 26 made of an elastic material is thicker at two sides and thinner in the central region. The upper surface of the button plate 26 is flat, while its lower surface is a ramp surface. As shown in FIG. 3b, the lower surface protrudes a plurality of second columns 262 for limiting vertical movement of the button plate 26 with respect to the printed circuit board 28. Besides, the lower surface of the button plate 26 also protrudes a plurality of the third columns 263 for playing the touch points to trigger the respective switches 281.

As shown, two opposing sides of the button plate 26 are structured as elastic arms 264. In particular, the elastic arm 264 is formed as a rectangle loop structure. Also, in the far end of the arms 264, a plurality of holes 2641 (three shown in this embodiment) are included for positioning the button plate 26 to the housing.

Referring to FIG. 3c, a perspective view of a preferred support element 27 of the present invention is shown. The support element 27 is a bone block to stand upright under the central region of the button plate 26. The support element 27 provides a first support element 271 to contact and thus support the central region of the button plate 26. Opposing to the first support element 271, the support element 27 also has a second element 272 to sit on a bracket 29 that will be described in a later section. Further, to help locate the support element 27 to the bracket 29, the support element 27 also includes a pair of fourth columns 273 separated to opposing sides of the second element 272.

In another preferred embodiment, the support element 27 can be made of a transparent material. Referring to FIG. 3d, a perspective view of another support element 30 is shown. In this embodiment, the support element 30 is made of a transparent material. Similar to the forgoing support element 27, the support element 30 also includes the first support element 301 and the second support element 302. In application, the light emitted by a light source located on the printed circuit board 28 and right under the support element 30 can be transmitted through the support element 30 and reach the central region of the button plate 26.

Referring to FIG. 3e, a perspective view of the bracket 29 of the present invention is perspective shown. Two ends of the bracket 29 are bent vertically so as to form the bracket 29 in a ⊓ shape as shown. The central region of the bracket 29 includes a bracket's hole 291 for the support element 27 or the second guide 272 of the support element 30 to pass through while in engaging with the bracket 29. Two holes 292 for engaging the fourth columns 273 by locking, hot melting or any relevant way are located aside to the bracket's hole 291, with one at each side. Also, a first hole 293 is located close to one longitudinal end of the bracket's hole 292. Referring to FIG. 3f, a perspective view of the bracket 29 mounted on the lower housing 22 of the present invention is shown. The bracket 29 is mounted on the support element 27 (or 30), while the support element 27 or 30 is mounted on the lower housing 22. As shown, the lower housing 22 provides a hook 2201 to lock on the bracket 29, and a column 2202 to engage the first hole 293 by screw-locking or other ways.

Figure 4:
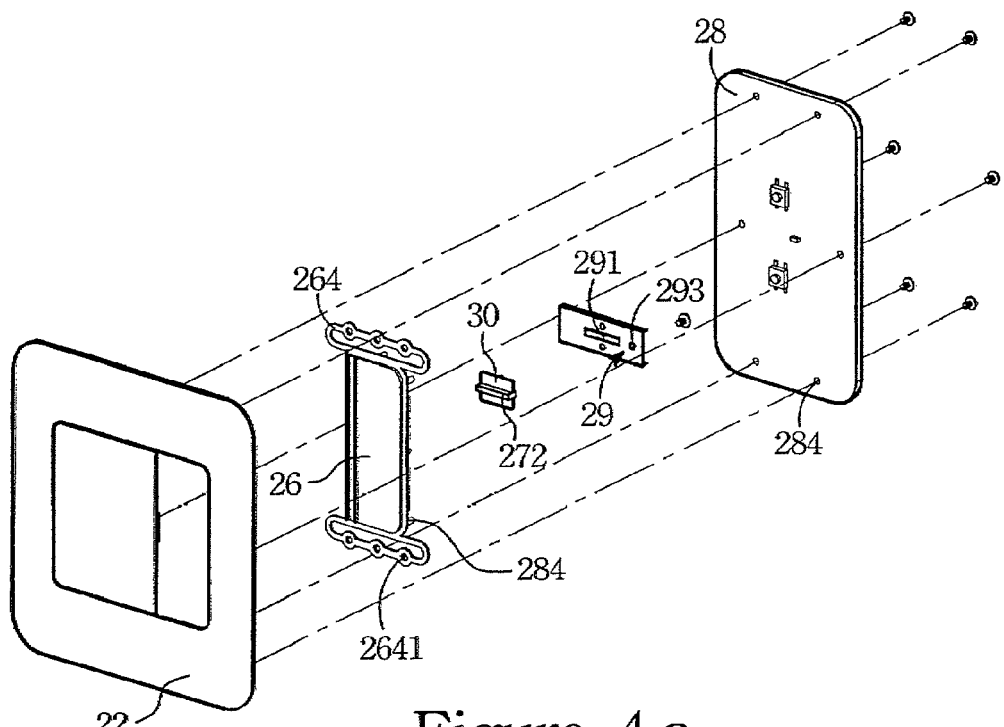
Figure 4:
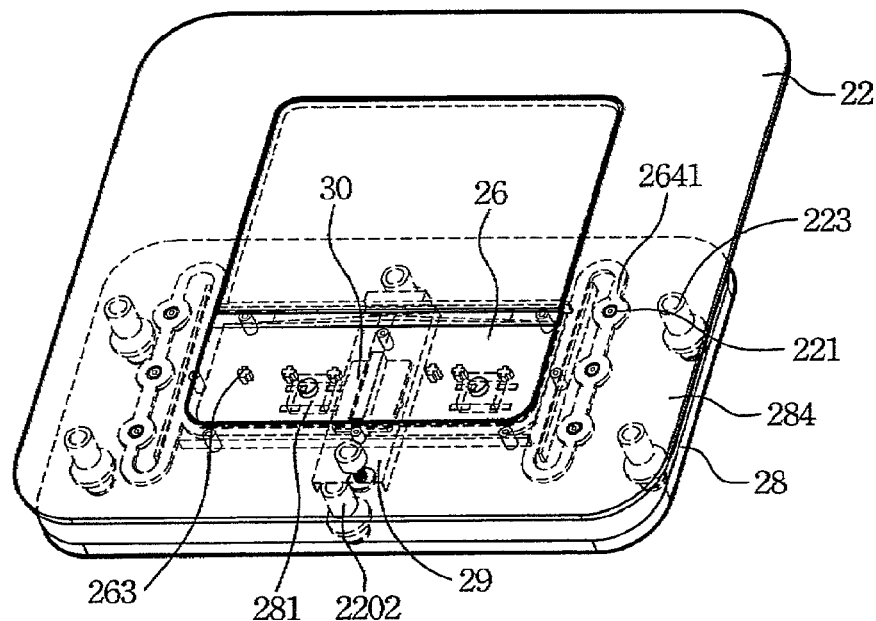

Referring to FIGS. 4a and 4b, an exploded view and a perspective view of the button structure of the present invention are respectively shown. The button structure includes a lower housing 22, a button plate 26, a support element 30, a bracket 29 and a printed circuit board (PCB) 28. The bracket 29 and the support element 30 are integrated by having the second support column 272 match with the bracket's hole 291. The first holes 293 of the bracket 29 are locked to the column 2202 of the lower housing 22. Two longitudinal ends of the bracket 29 are fixed, by hooks or screws, to the lower housing 22. The hole 2641 of the elastic arm 264 engages the fifth column 221 of the lower housing 22. As shown in FIG. 4b, the upper surface of the button plate 26 is exposed to the central opening 250 of the lower housing 22. The switches 281 of the PCB 28 are then located properly with respect to the third columns 263 of the button plate 26. The third holes 284 around the PCB 28 are locked to the sixth columns 223 of the lower housing 22. Upon such an arrangement, the left and right switches can be triggered by depressing the button plate 26 at proper positions, and the light from the PCB 28 can pass through the support element 30 and may be transmitted upward to project on the central region of the button plate 26.

In another embodiment, the button plate can be made of a plastics, a metal or other transparent materials. The button plate can be assembled in the housing or applied to other proper elements in the LED front frame. The appearance of the button plate can also be painted for any artistic or functional purpose. Further, the central region of the button plate has a thinner thickness, while the two sides have thicker thickness.

To sum up, the present invention provides a thickness-varying design to the button plate with a thinner thickness in the central region to overcome the shortcoming of the traditional touching plate in seesaw touching feeling. By providing the present invention, the button movement in the central region can be clearly felt by the fingers. Further, by providing the support element to support the button plate at the central region, support element or the support element and the bracket, touching on the button plate as well as the switch in either side of the support element can be easily distinguished. Also, by providing the transparent support element, the light emitted from elements on the printed circuit board can be transmitted upward to the central region of the button plate.

We claim:

1. An electronic device, comprising:
   a housing, having an opening;
   a button plate, disposed at the opening of the housing, having a central region and two sides, the button plate being mounted to the housing through two ends of the two sides formed by elastic arms respectively;
   a support element, disposed under the central region of the button plate for defining the button plate into left and right parts;

a bracket having a bracket hole to directly engage the support element, and a printed circuit board, located underneath the support element, having two switches located respectively corresponds to the left and right parts of the button plate.

2. The electronic device according of claim 1, wherein the button plate is a smooth thickness-varying plate.

3. The electronic device according of claim 1, wherein an upper surface of the button plate is a flat surface.

4. The electronic device according of claim 1, wherein the support element is made of a transparent material.

5. The electronic device according of claim 1, wherein the support element further includes a support column to support at the central region of the button plate.

6. The electronic device according of claim 1, wherein the central region includes a first thickness, the two sides respectively include a second thickness larger than the first thickness.

7. An electronic device, comprising:

a housing, having an opening;

a button plate, disposed at the opening of the housing, having a central region and two sides, the button plate being mounted to the housing through two ends of the two sides formed by elastic arms respectively;

a light guide, disposed under the central region of the button plate for defining the button plate into left and right parts, the light guide is made of a transparent material, and light under the light guide can be transmitted through the light guide and reach the central region of the button plate;

a bracket having a bracket hole to directly engage the light guide; and a printed circuit board, located underneath the light guide, having two switches located respectively corresponds to the left and right parts of the button plate.

8. The electronic device according of claim 7, wherein the button plate is a smooth thickness-varying plate.

9. The electronic device according of claim 8, wherein the light guide further includes a support column to support at the central region of the button plate.

10. The electronic device according of claim 8, wherein the central region includes a first thickness, the two sides respectively include a second thickness larger than the first thickness.

11. The electronic device according of claim 9, wherein an upper surface of the button plate is a flat surface.

* * * * *